(12) United States Patent
Ishikawa et al.

(10) Patent No.: US 7,832,304 B2
(45) Date of Patent: Nov. 16, 2010

(54) KNOB STRUCTURE OF A PARKING BRAKE APPARATUS

(75) Inventors: Hiroki Ishikawa, Dublin, OH (US); Satoru Masuda, Yokosuka (JP); Hiroshi Tsukamoto, Yokohama (JP)

(73) Assignee: Honda Motor Co., Ltd., Tokyo (JP)

( * ) Notice: Subject to any disclaimer, the term of this patent is extended or adjusted under 35 U.S.C. 154(b) by 578 days.

(21) Appl. No.: 11/470,050

(22) Filed: Sep. 5, 2006

(65) Prior Publication Data
US 2008/0053267 A1    Mar. 6, 2008

(51) Int. Cl.
*F16C 1/12* (2006.01)
(52) U.S. Cl. .......................... 74/501.6; 74/503
(58) Field of Classification Search ............... 74/536, 74/537, 538, 473.16, 501.6, 503; 403/364, 403/381
See application file for complete search history.

(56) References Cited

U.S. PATENT DOCUMENTS

| 3,086,250 | A | * | 4/1963 | Gits | 264/161 |
| 4,549,050 | A | * | 10/1985 | Lang | 200/314 |
| 5,493,932 | A | * | 2/1996 | Plocher | 74/483 R |
| 5,791,114 | A | * | 8/1998 | Mandel | 52/591.3 |

* cited by examiner

*Primary Examiner*—Richard W Ridley
*Assistant Examiner*—Terence Boes
(74) *Attorney, Agent, or Firm*—Mark E. Duell; Rankin Hill & Clark LLP

(57) ABSTRACT

A knob structure for parking brake apparatus that can prevent a sink mark or a weld mark from being produced at the time of molding, and allows an inexpensive resin material with a good moldability to be adopted. The knob structure includes a rod that is movably disposed on the vehicle body side, and a knob main body that is connected to the nose end side of the rod, wherein the knob main body is made up of a core part that is previously assembled to the nose end side of said rod, and a surface layer part that coats the surface of the core part after assembly with a substantially uniform coating thickness.

9 Claims, 5 Drawing Sheets

KNOB STRUCTURE OF A PARKING BRAKE APPARATUS

BACKGROUND OF THE INVENTION

The present invention relates to a knob structure for a parking brake apparatus. The parking brake apparatus includes a braking section that receives an operating force at the time of parking and transmits the operating force for generation of a braking force, and a releasing section that cancels the constrained state in which the operating force is held. The parking brake apparatus receives an operation releasing force in the releasing section.

Conventionally, this type of knob structure for a parking brake apparatus has been generally manufactured by cast molding a rod made of iron into a knob made of. The knob main body, which is connected to the rod held and guided by the guide rail, is a portion that is pulled by hand. Thus the knob main body is provided with a relatively large shape so as to be easily gripped.

Such a knob structure has been disposed under the inner panel in the vehicle. In addition, as an indicator (marking) to the driver, the knob is generally provided with a letter "P," a phrase of "BRAKE RELEASE," or the like by printing, seal affixing, or the like.

However, with the above-mentioned conventional knob structure for a parking brake apparatus, the shape of the knob main body is large, and, in the knob main body, the thickness may be non-uniform. For example, the thickness of a portion coating the rod is small as compared to that of other portions. A sink mark or a weld mark may be caused at the time of resin molding. Therefore, the knob main body must be designed with care so as to provide a uniform thickness throughout, which has presented a problem that the degree of restriction on design geometry is great.

In addition, on the knob main body, an indicator (marking) is printed or an indicator (marking) seal is affixed Thus a material which is suited for printing or seal affixing must be selected. Then, generally, a resin material, such as ABS, or the like, which is easy to be bonded to a paint, is often used. However, such a resin material has a poor moldability and is easy to be degraded by an oily matter applied to the mold, such as a rust preventive oil, or the like. Thus care must also have been taken not to cause cracks due to the deposition of such an oily matter.

The present invention has been made in view of the above-mentioned problems which have been presented by the conventional art, and the purpose of the present invention is to provide a knob structure for parking brake apparatus with which the thickness of the surface layer of the knob main body is rendered uniform, whereby occurrence of a sink mark or a weld mark at the time of molding can be avoided; that can indicate the necessary information without the need for printing on the knob main body or affixing a seal thereto; and that allows an inexpensive resin material with a good moldability to be adopted.

SUMMARY OF THE INVENTION

The aspects of the present invention to achieve the above-mentioned purpose are disclosed in the following items:

A knob structure for parking brake apparatus that, in a parking brake apparatus includes a braking section that receives an operating force at the time of parking and transmits the operating force for generation of a braking force, and a releasing section which cancels the constrained state in which the operating force is held, receives an operation releasing force in the releasing section, including:

a rod that is movably disposed on the vehicle body side, and a knob main body that is connected to the nose end side of the rod, wherein the knob main body is made up of a core part that is previously assembled to the nose end side of said rod, and a surface layer part that coats the surface of the core part after the assembling with a substantially uniform coating thickness.

The knob structure for a parking brake apparatus wherein said surface layer part is provided by insert molding of resin around the core part which has been previously assembled to the nose end side of said rod.

The knob structure for a parking brake apparatus wherein a portion of the core part is exposed on the surface of the surface layer part to provide an information display part by the exposed portion.

The knob structure for a parking brake apparatus wherein the core part is provided with an engaging part that engages with the engaged part provided on the nose end side of the rod for prevention of the rod from being dropped off from the core part.

According to the knob structure for a parking brake apparatus, the knob main body is manufactured such that it is made up of a core part that is previously assembled to the nose end side of the rod, and a surface layer part that coats the surface of the core part after the assembling with a substantially uniform coating thickness.

Thereby, the knob main body is provided with a double-structure. Thus the core part is tolerated to be non-uniform in thickness. For example, the portion where the nose end side of the rod is assembled is tolerated to be thin in thickness as compared to other portions. Even if a sink mark or a weld mark occurs in the resin molding, it can be prevented from appearing on the surface. Thus, there is no restriction on design geometry, such as that the core part must be uniform in thickness throughout, and it can be molded to an optional design geometry.

The surface layer part can be formed such that the surface of the core part is substantially uniformly coated in correspondence with the design geometry of the core part. Therefore, a sink mark or a weld mark at the time of resin molding can be prevented from occurring, and the appearance quality of the knob main body can be improved.

In addition, according to the knob structure for a parking brake apparatus, the surface layer part is provided by insert molding of resin around the core part that has been previously assembled to the nose end side of the rod. Thus at the time of manufacturing the knob structure, the insert molding can be performed in a single process, resulting in the manufacturing cost being reduced.

In addition, according to the knob structure for a parking brake apparatus, a portion of the core part is exposed on the surface of the surface layer part to provide an information display part by the exposed portion. Thus the necessary information can be indicated by the information display part with no need for printing on the knob main body or applying a seal thereto. Therefore, the need for selecting the resin material on the basis of the affinity to the paint or adhesive to be used can be eliminated, and an inexpensive resin material with a good moldability can be adopted.

Further, according to the knob structure for a parking brake apparatus, the core part is provided with an engaging part that engages with the engaged part provided on the nose end side of the rod for prevention of the rod from being dropped off from the core part The nose end side of the rod can be easily assembled to the core part, and the knob main body can be prevented from being dropped off the rod.

DETAILED DESCRIPTION OF THE INVENTION

Various embodiments of the present invention will be described below with reference to the drawings.

FIG. 1 to FIG. 4 illustrates a first embodiment of the present invention.

A parking brake apparatus 10 pertaining to the present embodiment includes a braking section 11 which receives an operating force at the time of parking, and transmits the operating force to generate a braking force, and a releasing section 21 which cancels the constrained state in which the operating force is held. The knob structure providing the heart of the present invention is the portion that receives the operation releasing force in the releasing section 21.

Figure 1:
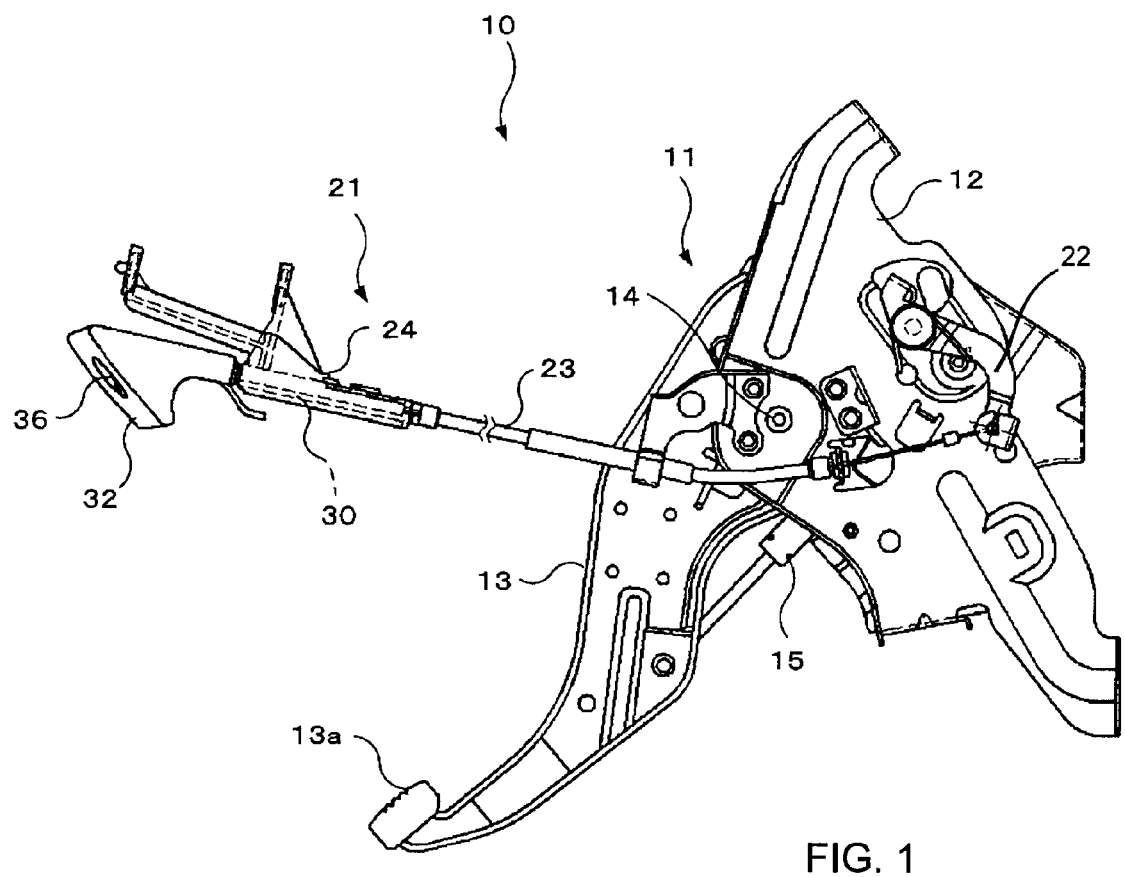
FIG. 1 is a side view illustrating the parking brake apparatus pertaining to a first embodiment of the present invention.

As shown in FIG. 1, in the braking section 11, the base part of a foot lever 13 is rockably supported through a pivotal shaft 14 in a base member 12 fixedly installed on the vehicle body side, the braking section 11 being configured such that, when a driver (operator) presses the foot lever 13 to rock it downward, the operating force is transmitted through a brake cable (not shown) to a brake unit for generating a braking force.

In FIG. 1, on the rear side of the base member 12, a pawl that is pivotally supported such that it is engaged with a sector gear tooth provided on the end edge side of the base part of the foot lever 13 for holding the operating force (braking force) of the foot lever 13, and a spring that energizes this pawl in the direction in which it is engaged with the sector gear tooth are provided. At the nose end of the foot lever 13, a pedal 13a is fixedly installed, and between the substantially middle portion of the foot lever 13 and the base member 12, a cushioning member 15 for alleviating the reaction that is caused when the foot lever 13 is returned are bridge-disposed.

The releasing section 21 is made up of a releasing member 22 that is pushably/pullably connected to the pawl; a release cable 23 which is fastened to the nose end side of the releasing member 22; and a knob structure that is connected to the nose end side of the release cable 23, and receives the operation releasing force applied by the driver pulling the knob structure. The knob structure includes a rod 30 that is movably disposed on the vehicle body side, and a knob main body 32 that is connected to the nose end side of the rod 30.

The rod 30 is movably disposed in a guide member 24 that is disposed under the vehicle inner panel, and on the base end side of the rod 30, the nose end side of said release cable 23 is fastened. The rod 30 is made of a metal, for example, an iron mandrel. When the knob main body 32 is pulled, this operation releasing force rocks the pawl through the release cable 23 in the direction in which it is disengaged from the sector gear tooth, canceling the constrained state in which said operating force is held.

Figure 2:
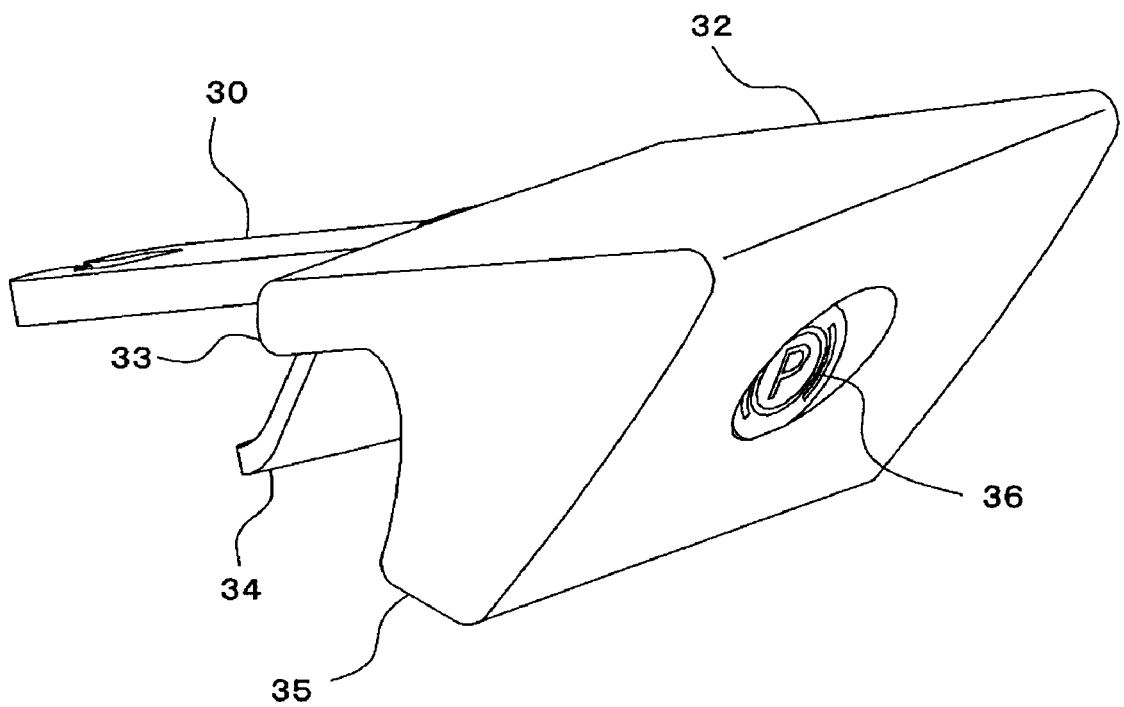
FIG. 2 is a perspective view illustrating the knob structure of the parking brake apparatus pertaining to the first embodiment of the present invention.
Figure 3:
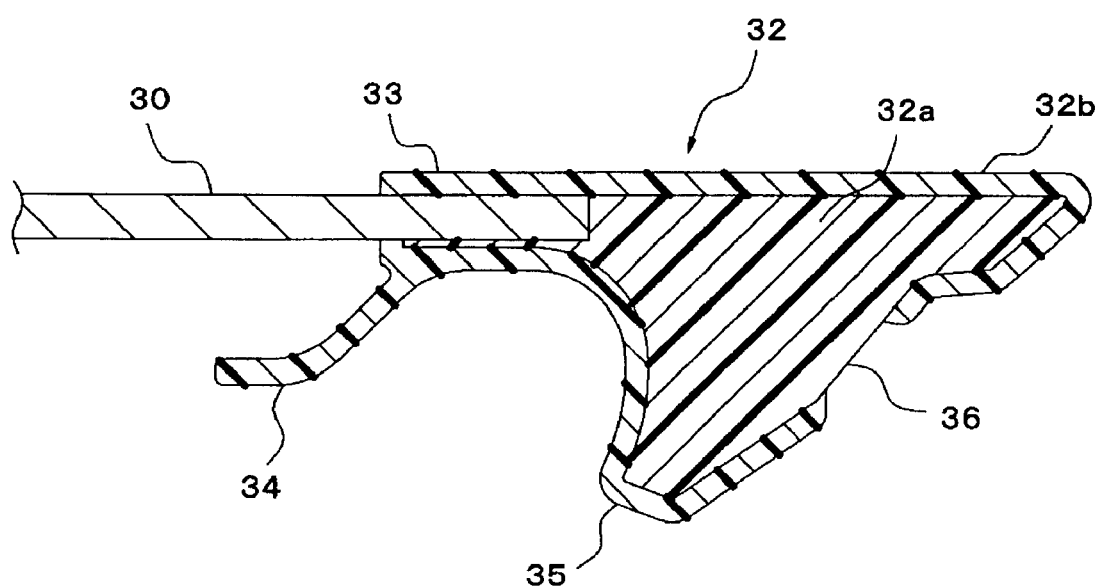
FIG. 3 is a sectional view illustrating the knob structure of the parking brake apparatus pertaining to the first embodiment of the present invention.

As shown in FIG. 2 and FIG. 3, into the knob main body 32 made up of a resin material, the nose end side of the flat rod 30 that extends in the longitudinal direction is inserted. With the knob main body 32, a connection part 33 that has a rectangular cross section, enclosing the rod 30; a cover part 34 that extends from the connection part 33 such that it covers the exposed portion of the rod 30; and a hand grip part 35 that is protruded downward such that the hand can grip it with the finger ends being aligned are integrally formed. The nose end side of the rod 30 is inserted into the connection part 33 of the knob main body 32.

As shown in FIG. 3, the knob main body 32 is made up of a core part 32a that is previously assembled to the nose end side of the rod 30, and a surface layer part 32b that coats the surface of the core part 32a after the assembling with a substantially uniform coating thickness. The surface layer part 32b is provided by insert molding around the core part 32a that has been previously assembled to the nose end side of the rod 30. Herein, the core part 32a is preferably designed to be downsized by a definite amount (for example, 2 to 3 mm) from the finished size of the knob main body 32. The core part 32a is also a resin molded item, and specific examples of the resin material that is recommended to be used include vinyl chloride, polyurethane, and the like. This is true for the material of the surface layer part 32b.

As shown in FIG. 2 and FIG. 3, a portion of the core part 32a, specifically a circular portion on the inclined front face side, is exposed on the surface of the surface layer part 32b to provide an information display part 36 by the exposed portion. The information display part 36 is exposed to the outside from the opening part provided in the portion of the surface layer part 32b that, on the front face side thereof, corresponds to the information display part 36. The information as given by the information display part 36 may be quite optional, however, in the present embodiment, "P", the capital letter of parking, is given as an indicator (marking) to the driver.

Figure 4:
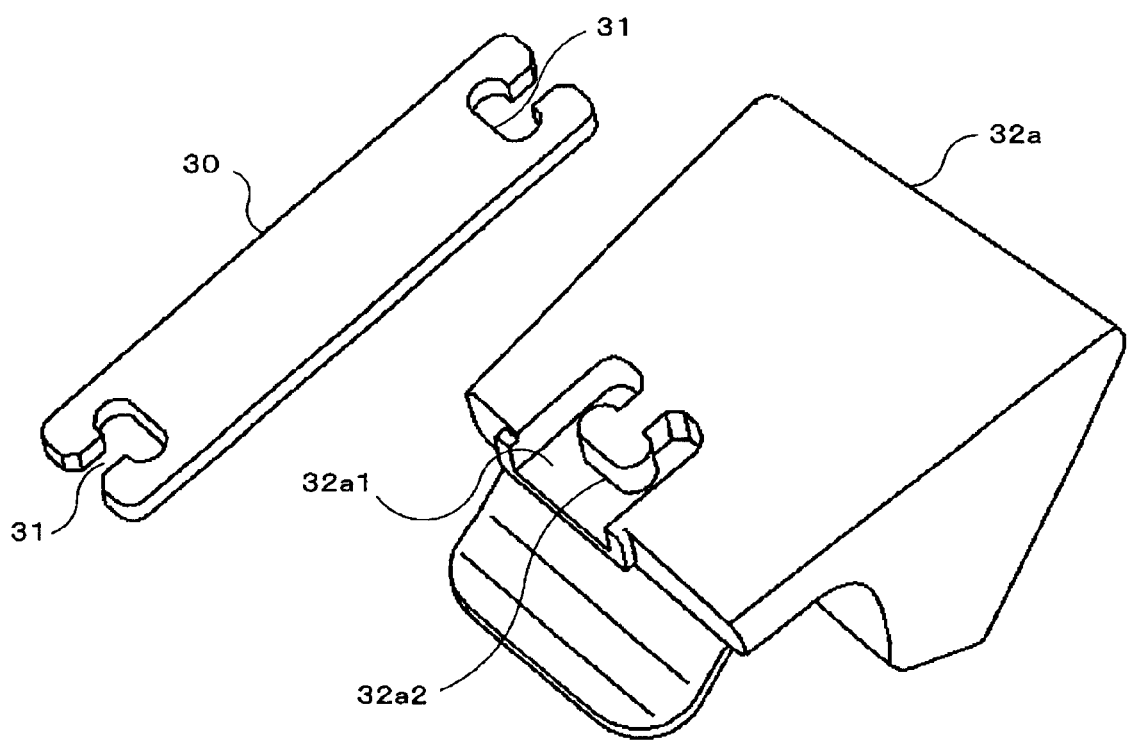
FIG. 4 is a perspective view illustrating the engagement relationship between the core part and the rod of the knob structure of the parking brake apparatus pertaining to the first embodiment of the present invention.

The core part 32a is previously assembled to the rod 30 before insert molding of the surface layer part 32b, however, as shown in FIG. 4, the nose end side and the base end side of the rod 30 are provided with a dovetail groove-like engaged part 31, respectively, and the nose end side of the rod 30 is fitted into a recess part 32a1 formed in the rear face on one end side of the core part 32a, the engaged part 31 on the nose end side of the rod 30 being engaged with an engaging part 32a2 having a section in the shape of a protrusion that is provided in the recess part 32a1.

Next, the function of the knob structure of the parking brake apparatus 10 pertaining to the present embodiment will be described. In order to manufacture the present knob structure, the rod 30 is assembled to the core part 32a of the knob main body 32 which has been already molded, as shown in FIG. 4. In other words, the nose end side of the rod 30 is fitted into the recess part 32a1 of the core part 32a, while the engaged part 31 of the nose end side of the rod 30 being engaged with the engaging part 32a2 provided in the recess part 32a1. Thereby, the core part 32a can be previously assembled to the nose end side of the rod 30 integrally with ease and quickness.

Thereafter, the surface layer part 32b of the knob main body 32 is provided by insert molding around the core part 32a which has been previously assembled to the nose end side of the rod 30. In other words, the core part 32a which has been assembled to the nose end side of the rod 30 is loaded in the mold before injecting the resin for enclosing the core part 32a with molten resin and solidifying it to coat the surface of the core part 32a with the surface layer part 32b with a substantially uniform coating thickness for integration.

As shown in FIG. 3, the knob main body 32 is provided with a double-structure, thus the core part 32a is tolerated to be non-uniform in thickness, for example, the connection part 33 where the nose end side of the rod 30 is assembled is tolerated to be thin in thickness as compared to other portions, and even if a sink mark or a weld mark occurs in the resin molding, it can be prevented from appearing on the surface. Therefore, there is no restriction on design geometry, such as that the core part 32a must be uniform in thickness throughout, and it can be molded to an optional design geometry.

Yet, the surface layer part 32b can be formed such that the surface of the core part 32a is substantially uniformly coated in correspondence with the design geometry of the core part 32a, whereby a sink mark or a weld mark at the time of resin molding can be prevented from occurring, and thus the appearance quality of the knob main body 32 can be improved. In addition, at the time of manufacturing the knob structure, the insert molding can be performed in a single process, resulting in the manufacturing cost being reduced. Further, the engaged part 31 on the nose end side of the rod 30 is engaged with the engaging part 32a2 of the core part 32a, which can positively prevent the knob main body 32 from being dropped off from the rod 30.

Further, as shown in FIG. 2, a portion of the core part 32a is exposed on the surface of the surface layer part 32b to provide an information display part 36 by the exposed portion, whereby the necessary information can be indicated by the information display part 36 with no need for printing on the knob main body 32 or applying a seal thereto. Therefore, the need for selecting the resin material on the basis of the affinity to the paint or adhesive to be used is eliminated, and thus an inexpensive resin material with a good moldability can be adopted. In addition, as in the present embodiment, the information display part 36 is recessed from the surface of the surface layer part 32b, whereby the information display part 36 is provided with a 3-D feeling.

Next, the operation of the foot lever 13 will be briefly described.

In FIG. 1, depressing the pedal 13a in the braking section 11 to rock the foot lever 13 downward will pull the brake cable to generate a braking force. When the braking force is sufficiently generated, releasing the pedal 13a depressed will cause the pawl to be engaged with the sector gear tooth in that position, resulting in the constrained state in which the operating force (braking force) of the foot lever 13 is held being brought about.

In order to cancel the constrained state, pulling the knob structure in the releasing section 21 forward by gripping the hand grip part 35 of the knob main body 32 with the finger ends being aligned will move the rod 30 forward in the guide member 24, resulting in the release cable 23 being strained and the releasing member 22 being turned. The cover part 34 eliminates a possibility of the operator finger touching the rod 30, enhancing the safety. With the releasing member 22 being turned, the pawl is rocked in the direction in which it is disengaged from the sector gear tooth; and the foot lever 13 is rocked in the return direction by the braking reaction force to be returned to the release state, the brake cable being loosened, which results in the braking force being released.

Figure 5:
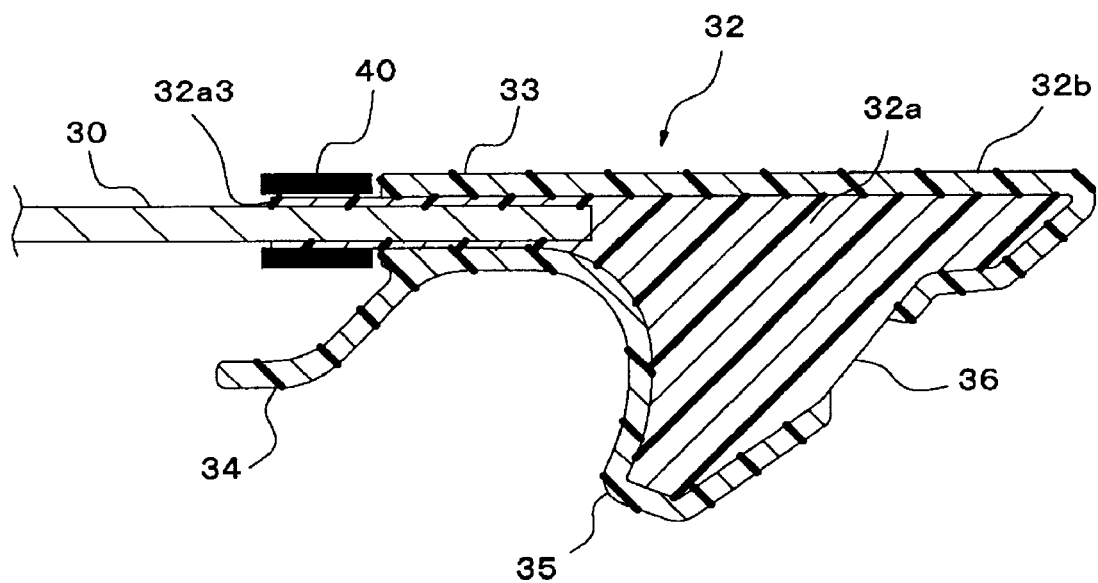
FIG. 5 is a perspective view illustrating the knob structure of the parking brake apparatus pertaining to a second embodiment of the present invention.

FIG. 5 shows a second embodiment of the present invention.

In the present embodiment, in the connection part 33 of the knob main body 32 into which the nose end side of the rod 30 is inserted, the base end of the core part 32a, from which the rod 30 is exposed, is formed as a protrusion part 32a3 that extends from the surface layer part 32b. The same portions as those in the first embodiment are provided with the same signs, and explanation is omitted.

In the present embodiment, at the time of insert molding of the surface layer part 32b, the protrusion part 32a3 of the core part 32a is held by a holder 40 in the mold as shown in FIG. 5, whereby the core part 32a can be more accurately positioned in the mold, which allows molding with a higher positioning accuracy of the surface layer part 32b with respect to the core part 32a (with a closer tolerance for thickness).

Hereinabove, the embodiments of the present invention have been described with reference to the drawings; however, the specific configuration is not limited to those as given in the above-described embodiments, and even if any alteration or addition is given within the scope of the spirit of the present invention, it would be included in the present invention. For example, the surface of the core part 32a may be provided with irregularities, such as grooves, or the like, for enhancing the integrity of the surface layer part 32b to the core part 32a.

Further, the core part 32a that is previously molded is designed to be downsized by a definite amount (for example, 2 to 3 mm) from the finished size of the knob main body 32, however, if, at the time of insert molding of the surface layer part 32b, the resin should have a poor fluidity, a weld mark or an unfilled portion might be produced Thus in such a case, the core part 32a may be more undersized, and inversely the resin thickness of the surface layer part 32b may be increased to improve the resin fluidity at the time of molding.

According to the knob structure for a parking brake apparatus that pertains to the present invention, the knob main body is made up of a core part that is previously assembled to the nose end side of the rod, and a surface layer part that coats the surface of the core part after the assembling with a substantially uniform coating thickness. Thus it can be molded to an optional design geometry, and allows prevention of occurrence of a sink mark or a weld mark at the time of resin molding, improving in appearance quality.

In addition, the surface layer part is provided by insert molding of resin around the core part that has been previously assembled to the nose end side of the rod. Thus at the time of manufacturing the knob structure, the insert molding can be performed in a single process, resulting in the manufacturing cost being reduced.

Further, a portion of the core part is exposed on the surface of the surface layer part to provide an information display part by the exposed portion. Thus the necessary information can be indicated by the information display part with no need for printing on the knob main body or applying a seal thereto, which allows an inexpensive resin material with a good moldability to be adopted.

What is claimed is:

1. A knob structure for a parking brake apparatus that, in a parking brake apparatus comprising a braking section which receives an operating force at the time of parking and transmits the operating force for generation of a braking force, and a releasing section which cancels the constrained state in which said operating force is held, receives an operation releasing force in said releasing section, comprising:

a rod that is movably disposed on a vehicle body side, the rod having a base side and a nose end side, and a knob main body that is connected to the nose end side of the rod, wherein said knob main body is made up of a core part that is previously assembled to the nose end side of said rod, and a surface layer part that coats the surface of the core part after assembly with a substantially uniform coating thickness, and wherein the surface layer part is immovable relative to the core part, and wherein said core part further comprises a dovetail groove shaped engaging part consisting of a generally rectangular hollowed portion with a T-shaped fastener that extends into the hollowed portion and is monolithic with the core part, the T-shaped fastener engages with an engaged part provided on the nose end side of said rod for prevention of the rod from being dropped off from said core part.

2. The knob structure of claim 1 wherein said substantially uniform coating thickness of said surface layer is between 2.0 and 3.0 mm.

3. The knob structure of claim 2 wherein said substantially uniform coating thickness of said surface layer is approximately 2.5 mm.

4. The knob structure for a parking brake apparatus of claim 1, wherein said surface layer part is provided by insert molding of resin around the core part.

5. The knob structure of claim 1, wherein the surface layer part contacts a portion of the rod.

6. The knob structure of claim 1, wherein a portion of said core part includes an information display and this display portion is not encapsulated by the surface layer part.

7. The knob structure of claim 6, wherein the information display is textual.

8. The knob structure of claim 6, wherein the information display portion has a marking placed thereon.

9. The knob structure of claim 1, wherein the surface layer part is single and monolithic.

* * * * *